(12) United States Patent
Tojo et al.

(10) Patent No.: US 11,354,072 B2
(45) Date of Patent: Jun. 7, 2022

(54) INFORMATION PROCESSING APPARATUS, ELECTRONIC DEVICE, AND INFORMATION PROCESSING SYSTEM

(71) Applicant: FUJIFILM Business Innovation Corp., Tokyo (JP)

(72) Inventors: Hiroyuki Tojo, Kanagawa (JP);
Masatoshi Hara, Kanagawa (JP);
Yoshitake Hamano, Kanagawa (JP);
Akira Shinada, Kanagawa (JP);
Tomoki Takemura, Kanagawa (JP);
Hideyuki Tomokane, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 235 days.

(21) Appl. No.: 16/292,354

(22) Filed: Mar. 5, 2019

(65) Prior Publication Data
US 2019/0286379 A1 Sep. 19, 2019

(30) Foreign Application Priority Data

Mar. 13, 2018 (JP) .............................. JP2018-045841

(51) Int. Cl.
*G06F 3/12* (2006.01)
*G06F 8/65* (2018.01)

(52) U.S. Cl.
CPC ............ *G06F 3/123* (2013.01); *G06F 3/1203* (2013.01); *G06F 8/65* (2013.01); *G06F 3/12* (2013.01); *G06F 3/1204* (2013.01)

(58) Field of Classification Search
CPC .......... G06F 3/123; G06F 3/1203; G06F 8/65; G06F 8/654; G06F 3/1285; G06F 3/1204; G06F 3/12

USPC ....................................................... 358/1.15
See application file for complete search history.

(56) References Cited

U.S. PATENT DOCUMENTS

| | | | | |
|---|---|---|---|---|
| 2008/0134165 A1* | 6/2008 | Anderson | .......... | H04N 21/4586 717/173 |
| 2009/0063842 A1* | 3/2009 | Azami | ....................... | G06F 8/65 713/2 |
| 2013/0111459 A1* | 5/2013 | Nakamoto | ................ | G06F 8/65 717/172 |

FOREIGN PATENT DOCUMENTS

| | | |
|---|---|---|
| JP | 2009053901 | 3/2009 |
| JP | 2009080550 | 4/2009 |
| JP | 2011065586 | 3/2011 |

OTHER PUBLICATIONS

"Office Action of Japan Counterpart Application", dated Mar. 1, 2022, with English translation thereof, p. 1-p. 8.

* cited by examiner

*Primary Examiner* — Darryl V Dottin
(74) *Attorney, Agent, or Firm* — JCIPRNET (57) ABSTRACT

An information processing apparatus includes a specifier that specifies a version of firmware to be applied to any of multiple components included in an electronic device, an acquirer that acquires component information corresponding to a parts configuration included in a target component to which the firmware is to be applied, a determiner that determines whether or not the specified version of the firmware is usable with the parts configuration corresponding to the acquired component information, and an executer that executes a prohibition process of prohibiting application of the specified version of the firmware in a case in which the determiner determines that the specified version of the firmware is unusable.

9 Claims, 9 Drawing Sheets

| PARTS | MODEL NAME ||||| 
|---|---|---|---|---|---|
| | TypeA1 | TypeA2 | TypeB1 | TypeC1 | TypeC2 |
| P1 | P1-01 ||| P1-02 ||
| P2 | P2-01 || P2-02 | P2-03 ||
| P3 | P3-01 |||| P3-02 |
| P4 | P4-01 | P4-02 | P4-03 |||

FIG. 6

| FIRMWARE | MODEL NAME |||||
|---|---|---|---|---|---|
| | TypeA1 | TypeA2 | TypeB1 | TypeC1 | TypeC2 |
| V1.0 | ✓ | ✓ | ✓ | ✗ | ✗ |
| V1.1 | ✓ | ✓ | ✓ | ✗ | ✗ |
| V1.2 | ✓ | ✓ | ✓ | ✓ | ✗ |
| V2.0 | ✗ | ✓ | ✓ | ✓ | ✓ |
| V2.1 | ✗ | ✗ | ✓ | ✓ | ✓ |
| V3.0 | ✗ | ✗ | ✗ | ✓ | ✓ |

FIG. 7A

| FIRMWARE WORK SCREEN | |
|---|---|
| THE FOLLOWING FIRMWARE WAS APPLIED. | |
| TARGET | IMAGE PROCESSING BOARD |
| MODEL NAME | TypeA2 |
| FIRMWARE VERSION | V1.1 |

FIG. 7B

| FIRMWARE WORK SCREEN | |
|---|---|
| THE FOLLOWING FIRMWARE IS UNSUPPORTED AND WAS NOT APPLIED. | |
| TARGET | IMAGE PROCESSING BOARD |
| MODEL NAME | TypeC2 |
| FIRMWARE VERSION | V1.1 |

| FIRMWARE | MODULE | MODEL NAME | | | | |
|---|---|---|---|---|---|---|
| | | TypeA1 | TypeA2 | TypeB1 | TypeC1 | TypeC2 |
| V1.0 | M1 | ✓ | ✓ | ✓ | ✓ | ✓ |
| | M2 | ✓ | ✓ | ✓ | ✗ | ✗ |
| | M3 | ✓ | ✓ | ✓ | ✓ | ✗ |
| | M4 | ✓ | ✓ | ✓ | ✓ | ✓ |
| | M5 | ✓ | ✓ | ✓ | ✓ | ✓ |
| ... | ... | ... | ... | ... | ... | ... |

| FIRMWARE | MODEL NAME | | | | |
|---|---|---|---|---|---|
| | TypeA1 | TypeA2 | TypeB1 | TypeC1 | TypeC2 |
| V1.0 | ✓ | ✓ | ? | × | × |
| V1.1 | ✓ | ✓ | ? | × | × |
| V1.2 | ? | ✓ | ✓ | ✓ | × |
| V2.0 | × | ? | ✓ | ✓ | ? |
| V2.1 | × | × | ✓ | ✓ | ✓ |
| V3.0 | × | × | × | ✓ | ✓ |

FIG. 12

FIRMWARE WORK SCREEN

DO YOU WANT TO APPLY THE FOLLOWING FIRMWARE?

| TARGET | IMAGE PROCESSING BOARD |
|---|---|
| MODEL NAME | TypeA2 |
| FIRMWARE VERSION | V2.0 |
| EFFECTS OF APPLICATION | THE ADDRESS BOOK WILL BE RESET. |

B1~[ YES ]     [ NO ]~B2

FIG. 15 under 35 USC 119 from Japanese Patent Application No. 2018-045841 filed Mar. 13, 2018.

INFORMATION PROCESSING APPARATUS, ELECTRONIC DEVICE, AND INFORMATION PROCESSING SYSTEM

CROSS-REFERENCE TO RELATED APPLICATIONS

This application is based on and claims priority under 35 USC 119 from Japanese Patent Application No. 2018-045841 filed Mar. 13, 2018.

BACKGROUND

(i) Technical Field

The present disclosure relates to an information processing apparatus, an electronic device, and an information processing system.

(ii) Related Art

Japanese Unexamined Patent Application Publication No. 2009-053901 discloses a technology in which, for each piece of software in an update package, the software residing in non-volatile storage and an authorization key are overwritten by software in the update information and a new authorization key, but only for software in which the authorization key in the non-volatile storage and a verification key in the update package exist in a predetermined relationship.

SUMMARY

Firmware applied to the components of an electronic device such as an image forming apparatus may have various versions in some cases. On the other hand, in each component, the parts used may have been modified with newer parts in some cases. In such cases, inexpedient operation may occur, depending on the combination of the parts used and the firmware version.

Aspects of non-limiting embodiments of the present disclosure relate to avoiding an inexpedience in the operation of the components of an electronic device due to the application of firmware.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a specifier that specifies a version of firmware to be applied to any of multiple components included in an electronic device, an acquirer that acquires component information corresponding to a parts configuration included in a target component to which the firmware is to be applied, a determiner that determines whether or not the specified version of the firmware is usable with the parts configuration corresponding to the acquired component information, and an executer that executes a prohibition process of prohibiting application of the specified version of the firmware in a case in which the determiner determines that the specified version of the firmware is unusable.

BRIEF DESCRIPTION OF THE DRAWINGS

An exemplary embodiment of the present disclosure will be described in detail based on the following figures, wherein.

DETAILED DESCRIPTION

[1] Exemplary Embodiment

Figure 1:
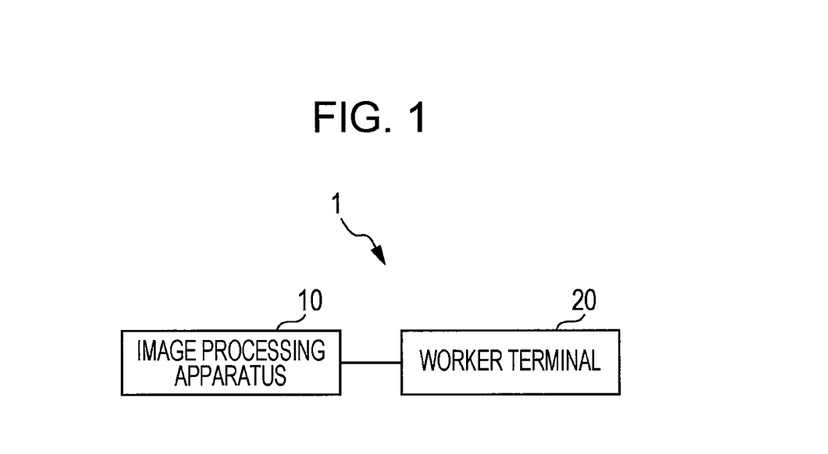
FIG. 1 is a diagram illustrating an overall configuration of a firmware application support system according to the exemplary embodiment.

FIG. 1 illustrates an overall configuration of a firmware application support system 1 according to the exemplary embodiment. The firmware application support system 1 is a system that supports the application of firmware to each component of an electronic device that includes multiple components. Firmware is a program for causing each component (all of which are hardware) included in the electronic device to operate, and is used by being installed in the electronic device. "Applying firmware" means installing the firmware in the electronic device.

In the exemplary embodiment, the firmware application support system 1 is provided with an image processing apparatus 10 that acts as the electronic device and a worker terminal 20, and supports the application of firmware to each component provided in the image processing apparatus 10. The image processing apparatus 10 forms an image on a medium such as paper by an electrophotographic system, for example. In the exemplary embodiment, the worker terminal 20 is connected to the image processing apparatus 10 in a peer-to-peer (P2P) manner, and receives operations related to firmware application performed by a worker.

Figure 2:
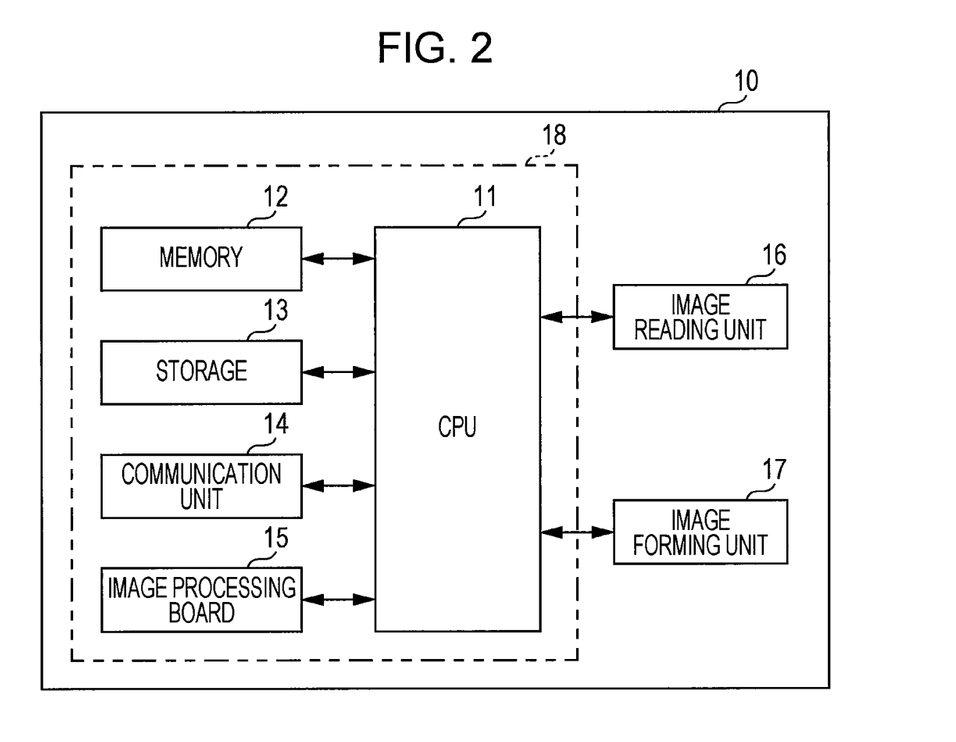
FIG. 2 is a diagram illustrating a hardware configuration of an image processing apparatus.

FIG. 2 illustrates a hardware configuration of the image processing apparatus 10. The image processing apparatus 10 is a computer provided with at least a central processing unit (CPU) 11, memory 12, storage 13, a communication unit 14, an image processing board 15, an image reading unit 16, and an image forming unit 17. The memory 12 is provided with random access memory (RAM), read-only memory (ROM), and the like. The CPU 11 controls the operations of each unit by executing a program stored in the ROM or the storage 13 while using the RAM of the memory 12 as a work area.

The storage 13 is a storage medium such as a hard disk drive (HDD), a solid-state drive (SSD), or flash memory, storing data and programs used in the control by the CPU 11. The communication unit 14 includes a communication circuit or the like, and communicates with external apparatus through a communication link (communication by at least one of wired communication and wireless communication). The image processing board 15 is a board provided with circuits and the like that execute image-related processing in particular.

The image reading unit 16 is provided with a light source and an image sensor the like, and optically reads an image exhibited on the surface of a sheet-like medium placed on a document glass. The image forming unit 17 is provided with a photoreceptor, an exposure apparatus, a development apparatus, a transport apparatus, a fusing apparatus, and the like, and forms an image on a medium transported by the transport apparatus by an electrophotographic system. The image forming unit 17 is one example of an "image forming unit" of the present disclosure. The CPU 11, the memory 12, the storage 13, the communication unit 14, and the image processing board 15 function as a controller 18 that controls the apparatus as a whole, including the image reading unit 16 and the image forming unit 17.

For example, the controller 18 executes processing such as processing image data expressing an image read by the image reading unit 16 or image data transmitted from an external apparatus into a format that the image forming unit 17 is able to process. Each of the image reading unit 16, the image forming unit 17, and the controller 18 is provided with multiple components, including the components illustrated in FIG. 2 and components not illustrated, and operates by executing firmware applied to each component.

Figure 3:
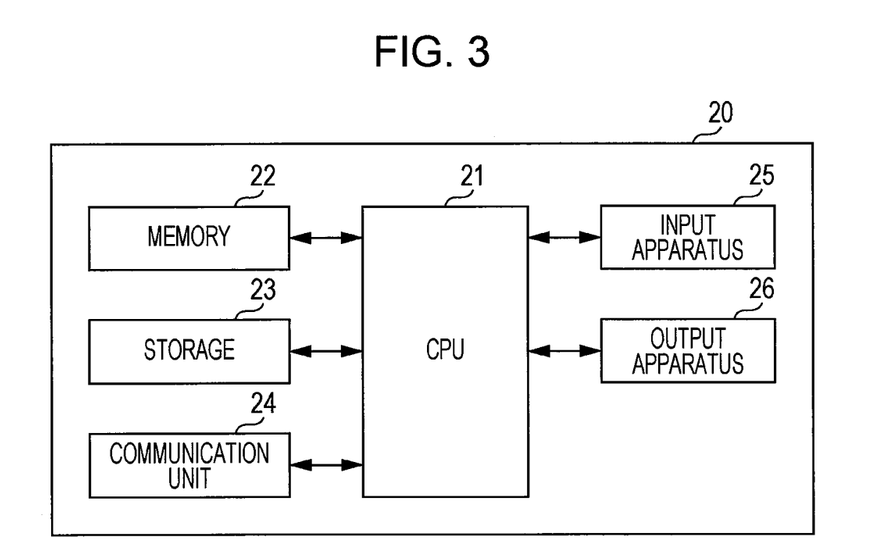
FIG. 3 is a diagram illustrating a hardware configuration of a worker terminal.

FIG. 3 illustrates a hardware configuration of the worker terminal 20. The worker terminal 20 is a computer provided with at least a CPU 21, memory 22, storage 23, a communication unit 24, and apparatus such as an input apparatus 25 and an output apparatus 26. The CPU 21 to the communication unit 24 have hardware of a similar type to that illustrated in FIG. 2. The input apparatus 25 is input devices (such as a keyboard and a mouse) that receive input from the outside. The output apparatus 26 is output devices (such as a display and a speaker) that produce output to the outside.

By having the CPU of each apparatus execute a program and control each unit, the functions described below are realized.

Figure 4:
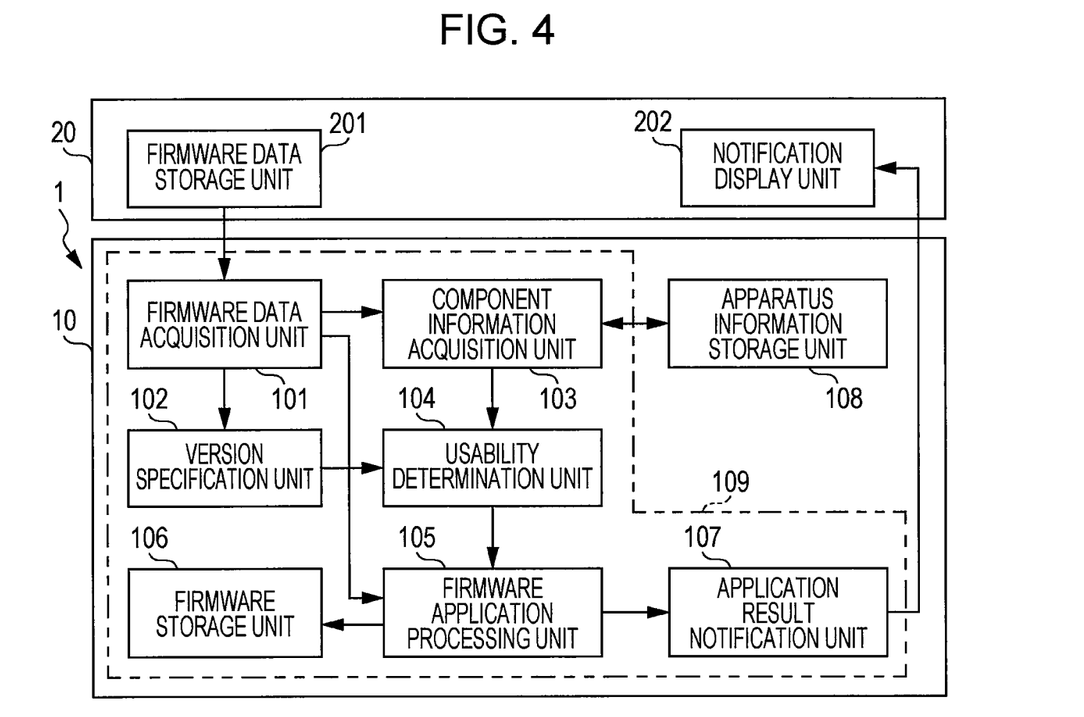
FIG. 4 is a diagram illustrating a functional configuration realized by the firmware application support system.

FIG. 4 illustrates a functional configuration realized by the firmware application support system 1. The image processing apparatus 10 is provided with a firmware data acquisition unit 101, a version specification unit 102, a component information acquisition unit 103, a usability determination unit 104, a firmware application processing unit 105, a firmware storage unit 106, an application result notification unit 107, and an apparatus information storage unit 108. The worker terminal 20 is provided with a firmware data storage unit 201 and a notification display unit 202.

The firmware data storage unit 201 of the worker terminal 20 stores firmware data, which is data related to firmware to be applied to each component of the image processing apparatus 10. In the exemplary embodiment, a case in which firmware is applied to the image processing board 15 illustrated in FIG. 2 is described as an example. With respect to the firmware applied to each component of the image processing apparatus 10, new versions of the firmware containing program corrections, additions and the like are released over time after production of the image processing apparatus 10 is started.

Each firmware version may be downloaded from a homepage or the like of the manufacturer that provides the image processing apparatus 10, for example. Also, in the exemplary embodiment, it is assumed that the manufacturer homepage or the like provides firmware data that includes not only the firmware, but also other information that is relevant when applying the firmware. The other information is, for example, information about the names of components that are the target of the firmware, and information indicating the version of the firmware (version information).

Herein, the component that is the application target of the firmware is hardware that itself includes one or more parts (such as a board and an integrated circuit (IC) chip or the like mounted thereon, for example). The image processing apparatus 10 is provided with the image processing board 15 from the beginning of production, but the parts included in the image processing board 15 may be modified over time because of circumstances, such as the end of the production line of the supplier who provides the parts. The image processing board 15 is assigned a model name that differs every time the parts configuration included in the image processing board 15 itself is modified.

Figure 5:
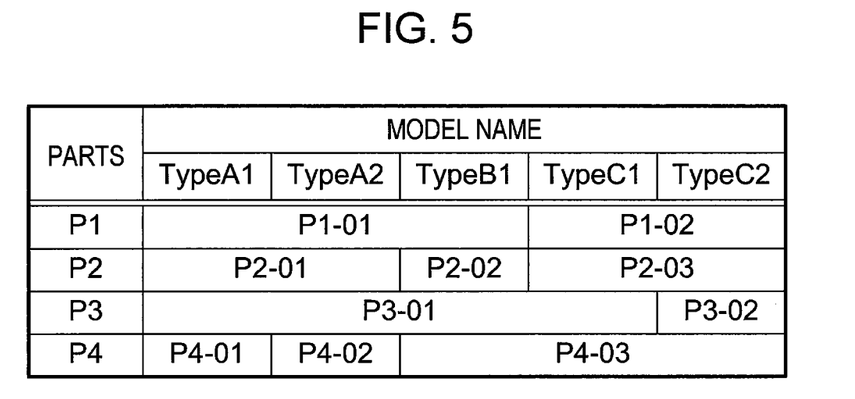
FIG. 5 is a diagram illustrating an example of model names and parts configurations of an image processing board.

FIG. 5 illustrates an example of model names and parts configurations of the image processing board 15. In the example of FIG. 5, in association with modifications of four types of parts from "P1" to "P4", the model name of the image processing board 15 changes to "TypeA1", "TypeA2", "TypeB1", TypeC1", and "TypeC2". For example, "TypeA1" is changed to "TypeA2" due to "P4" being modified from model parts named "P4-01" to model parts named "P4-02".

Also, "TypeA2" is changed to "TypeB1" due to "P2" being modified from "P2-01" to "P2-02" and "P4" being modified from "P4-02" to "P4-03". Also, "TypeB2" is changed to "TypeC1" due to "P1" being modified from "P1-01" to "P1-02" and "P2" being modified from "P2-02" to "P2-03", and "TypeC1" is changed to "TypeC2" due to "P3" being modified from "P3-01" to "P3-02".

On the other hand, firmware is created to cause each of the parts included in a component to operate, but for example, the firmware created when only TypeA1 was being manufactured was released after confirming operation for the parts P1-01, P2-01, P3-01, and P4-01 provided in TypeA1, but the firmware may not operate with the new parts in some cases. Meanwhile, the firmware created during the manufacturing period of TypeC2 may be released after confirming operation (supporting) the parts provided in TypeC2 obviously, as well as the parts used in the past.

However, since supporting all parts from the past leads to challenges such as cost increases due to increased testing and additional complexity of the program, support may be terminated for old parts in some cases.

Figure 6:
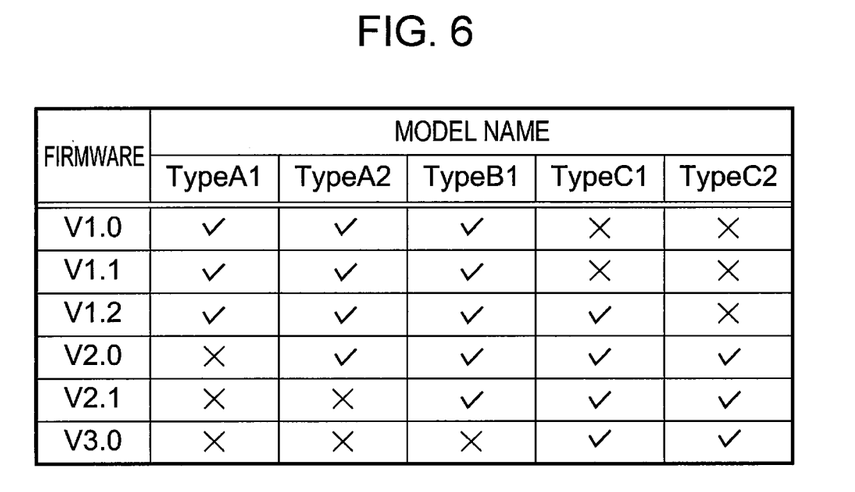
FIG. 6 is a diagram illustrating an example of the support relationship between firmware versions and parts.

FIG. 6 illustrates an example of the support relationship between firmware versions and parts. For example, FIG. 6 illustrates that the "V1.0" firmware supports all parts from "TypeA1" up to "TypeB1" (the supported case is denoted with a check mark), but "TypeC1" and "TypeC2" have some unsupported parts (the unsupported case is denoted with an X).

This means that the "V1.0" firmware does not support one or both of the parts "P1-02" and "P2-03" that have been modified in the course of going from "TypeB1" to "TypeC1". Similarly, for the firmware of each of the versions "V1.1", "V1.2", "V2.0", "V2.1", and "V3.0", models in which all parts are supported are denoted with a check mark, while models in which at least one of the parts is unsupported are denoted with an X.

If firmware is applied to a model of the image processing board 15 that the firmware version does not support, there is a possibility of an inexpedience occurring. An inexpedience refers to, for example, a specific function not operating, loss of data, an abnormality occurring in the exchange of data with external equipment, and the like. Accordingly, the firmware provided in the exemplary embodiment includes the name information and version information described above, together with information (support information) indicating which model names are supported by that version of the firmware.

The worker terminal 20 is operated by a worker, and downloads firmware data that includes firmware to be applied to the image processing apparatus 10. The firmware data storage unit 201 stores the firmware data downloaded in this way. Firmware is applied to bring the installed firmware up to the latest version (version upgrade), for example.

However, the application of firmware is not limited to the above, and in some cases, an old version of firmware is applied (version downgrade) to maintain a uniform environment of the image processing apparatus 10 inside a corporation, for example. The following will describe the case of executing a version downgrade, or in other words, the case in which the firmware to be applied is an older version than the firmware currently applied to the target components. The firmware data storage unit 201 transmits the stored firmware data to the image processing apparatus 10 according to a worker operation.

The firmware data acquisition unit 101 of the image processing apparatus 10 acquires the firmware data transmitted from the worker terminal 20, or in other words, data including firmware, version information, and support information. The firmware data acquisition unit 101 supplies the acquired firmware data to the version specification unit 102 and the component information acquisition unit 103. The version specification unit 102 specifies the version of the firmware to be applied to one of the multiple components included in the electronic device. The version specification unit 102 is one example of a "specifier" according to the present disclosure.

In the exemplary embodiment, the version specification unit 102 specifies the version of the firmware to be applied to the image processing board 15 included in the image processing apparatus 10 itself. The version specification unit 102 specifies the version indicated by the version information included in the firmware data supplied from the firmware data acquisition unit 101 as the version of the firmware to be applied to the image processing board 15. The version specification unit 102 reports the specified version to the usability determination unit 104.

The component information acquisition unit 103 acquires component information, that is, information corresponding to the parts configuration included in the component targeted for firmware application. The component information acquisition unit 103 is one example of an "acquirer" according to the present disclosure. In the image processing board 15, as illustrated in FIG. 5, parts configurations and model names have a 1-to-1 correspondence. In other words, parts configurations and model names exist in a relationship such that if the parts configuration is known, the model name is specified, and if the model name is known, the parts configuration is specified.

The component information acquisition unit 103 acquires the model name of the component (in the exemplary embodiment, the image processing board 15) indicated by the name information included in the firmware data supplied from the firmware data acquisition unit 101 as component information. The component information acquisition unit 103 acquires the component information from the apparatus information storage unit 108. The apparatus information storage unit 108 stores information (apparatus information) related to the apparatus itself (image processing apparatus 10).

In the exemplary embodiment, the apparatus information includes information about the set values of parameters used in the operation of the apparatus, as well as the model names of components as information related to the components included in the apparatus. The component information acquisition unit 103 requests the model name of the component indicated by the name information described above from the apparatus information storage unit 108, and acquires the model name reported in a response as the component information. The component information acquisition unit 103 supplies the acquired component information to the usability determination unit 104.

The usability determination unit 104 determines whether or not the firmware of the version specified by the version specification unit 102 is usable with the parts configuration corresponding to the component information acquired by the component information acquisition unit 103. The usability determination unit 104 is one example of a "determiner" according to the present disclosure. Herein, "usable" means that in the exemplary embodiment, operation has been confirmed after the firmware is applied. Operation confirmation refers to confirming that a predetermined range of operation is functioning correctly as a result of applying firmware, and generally is carried out the manufacturer of the target electronic device.

The application of unconfirmed firmware is itself possible, but in this case, there is a risk of an inexpedience occurring, such as unexpected operation of the apparatus, or the loss of data. For this reason, the usability determination unit 104 determines that unconfirmed firmware is unusable. Note that even unconfirmed firmware ultimately may operate correctly without an inexpedience occurring, but since such firmware lies outside the scope of support provided by the manufacturer, in the exemplary embodiment, such firmware is also determined to be unusable.

The usability determination unit 104 stores a support table indicating the support relationships illustrated in FIG. 6, for example, and makes the determination using the support table. For example, in the case in which the acquired component information indicates "TypeB1", and version "V1.1" is specified, since a check mark is associated with this model name and version in the support table, the usability determination unit 104 determines that the firmware is usable.

Also, in the case in which the acquired component information indicates "TypeC2", and version "V1.2" is specified, since an X is associated with this model name and version in the support table, the usability determination unit 104 determines that the firmware is unusable. The usability determination unit 104 reports the result determined as above, together with the component information used in the determination, to the firmware application processing unit 105.

The firmware application processing unit 105 is also supplied with the firmware data acquired from the firmware data acquisition unit 101. The firmware application processing unit 105 executes an application process of applying the firmware acquired by the firmware data acquisition unit 101 to the component targeted for firmware application (in the exemplary embodiment, the image processing board 15).

The firmware application processing unit 105 executes the application process in the case in which the usability determination unit 104 has determined that the firmware is usable with the target component. Specifically, the firmware application processing unit 105 executes a process of storing the firmware supplied from the firmware data acquisition unit 101 in the firmware storage unit 106 as the application process. The firmware storage unit 106 is provided with a storage area that stores applied firmware, and stores the firmware applied to each component of the apparatus itself (image processing apparatus 10) in this storage area.

Since an already-applied version of the firmware is stored in the firmware storage unit 106, the firmware application processing unit 105 stores the firmware to be applied by overwriting the already-stored firmware. When the application process is executed, the firmware application processing unit 105 notifies the application result notification unit 107 that the application process has been executed, and in addition, supplies firmware data including the firmware that has been applied and component information about the component to which the firmware has been applied.

Also, in the case in which the usability determination unit 104 has determined that the firmware is usable with the target component, the firmware application processing unit 105 executes a prohibition process for prohibiting the application of the firmware. The firmware application processing unit 105 is one example of an "executor" according to the present disclosure. In the exemplary embodiment, even if firmware determined to be unusable is supplied, the firmware application processing unit 105 executes a process of discarding the firmware without storing the firmware in the firmware storage unit 106 as the prohibition process.

Also, when the prohibition process is executed, the firmware application processing unit 105 notifies the application result notification unit 107 that the prohibition process has been executed, and in addition, supplies firmware data including the firmware that was to be applied and component information about the component to which the firmware was to be applied. The application result notification unit 107 reports the result of firmware application by the firmware application processing unit 105 to the user (in the exemplary embodiment, a worker who operates the worker terminal 20). The application result notification unit 107 is one example of a "first notifier" according to the present disclosure.

When firmware data is supplied from the firmware application processing unit 105, the application result notification unit 107 reports the firmware indicated by the firmware data to the user (in the exemplary embodiment, a worker who operates the worker terminal 20) as the firmware on which the application process or the prohibition process has been executed.

Specifically, the application result notification unit 107 issues a notification by generating notification data indicating the name information and the version information indicated by the supplied firmware and the component information supplied together, and transmitting the generated notification data to the worker terminal 20. The worker terminal 20 supplies the transmitted notification data to the notification display unit 202. The notification display unit 202 displays the content (the content indicated by the received notification data) reported from the image processing apparatus 10 (application result notification unit 107).

Figure 7A:
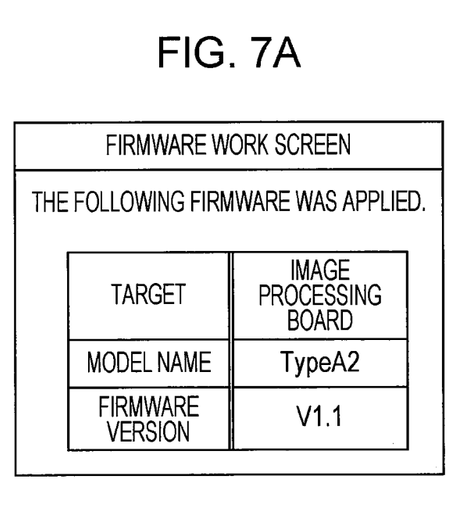
FIGS. 7A and 7B are diagrams illustrating examples of displayed notification content.

FIGS. 7A and 7B illustrate examples of displayed notification content. In the example of FIG. 7A, on a "firmware work screen", the notification display unit 202 displays the character string "The following firmware was applied." and indicates that the target is the "image processing board", the model name is "TypeA2", and the firmware version is "V1.1". The above is the information indicated by the name information, the component information, and the version information, respectively.

Figure 7B:
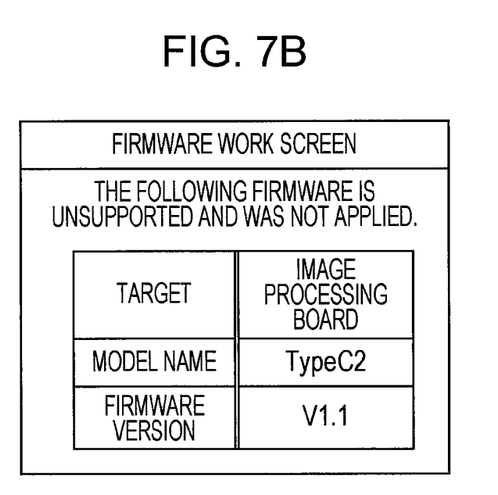

In the example of FIG. 7B, the same content as the example of FIG. 7A is displayed, except that character string is "The following firmware is not supported and was not applied." and the model name is changed to "TypeC2". As above, the firmware data acquisition unit 101, the version specification unit 102, the component information acquisition unit 103, the usability determination unit 104, the firmware application processing unit 105, the firmware storage unit 106, and the application result notification unit 107 function as a firmware application controller 109 (also called a downloader) that controls the operations of applying firmware to a component of the apparatus itself.

The image processing apparatus 10 executes an application control process that controls the application of firmware on the basis of the above configuration.

Figure 8:
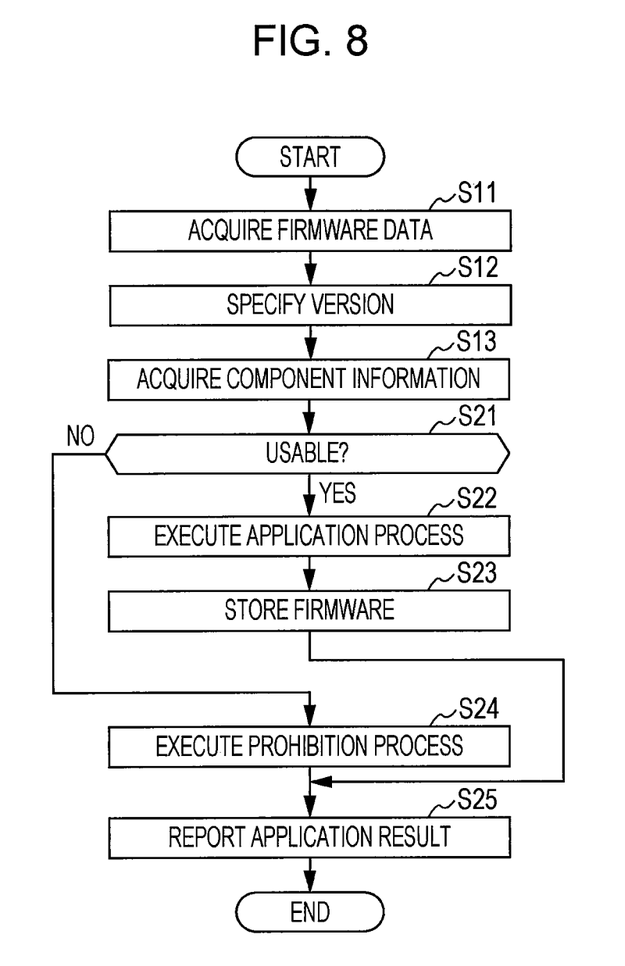
FIG. 8 is a diagram illustrating an example of an operating procedure in an application control process.

FIG. 8 illustrates an example of an operating procedure in the application control process. This operating procedure is started when triggered by the worker operating the worker terminal 20 to download and provide firmware data to the image processing apparatus 10. First, the image processing apparatus 10 (firmware data acquisition unit 101) acquires the firmware data (data including firmware, version information, and support information) transmitted from the worker terminal 20 (step S11).

Next, the image processing apparatus 10 (version specification unit 102) specifies the version of the firmware to be applied (step S12). Next, the image processing apparatus 10 (component information acquisition unit 103) acquires component information about a component that is a target of firmware application (step S13). Note that steps S12 and S13 may also be executed in reverse order, or in parallel.

Next, the image processing apparatus 10 (usability determination unit 104) determines whether or not the firmware of the version specified in step S12 is usable with the parts configuration corresponding to the component information acquired in step S13 (step S21). In the case of determining that the version of firmware is usable (YES) in step S21, the image processing apparatus 10 (firmware application processing unit 105) executes the application process of applying the firmware to the target component (step S22).

When the application process is executed, the image processing apparatus 10 (firmware storage unit 106) stores the applied firmware (step S23). Also, in the case of determining that the version of firmware is unusable (NO) in step S21, the image processing apparatus 10 (firmware application processing unit 105) executes the prohibition process of prohibiting application of the firmware (step S24). After the operations in steps S23 and S24, in either case, the image processing apparatus 10 (application result notification unit 107) reports the firmware application result to the user (step S25).

In the exemplary embodiment, as described above, the firmware to be applied is not applied to the component (image processing board 15) having a parts configuration that is unsupported by that version of the firmware. With this arrangement, an inexpedience in the operation of a component of the electronic device (image processing apparatus 10) due to the application of the firmware is avoided. Also, typically the latest version of firmware is applied in most cases, but the exemplary embodiment anticipates the case of a version downgrade, and also determines whether or not old versions of firmware are usable.

With this arrangement, even when performing a firmware version downgrade, an inexpedience in the operation of a component of the electronic device due to the application of the firmware is avoided. Also, in the exemplary embodiment, in the case in which the prohibition process is executed, the user (worker) is notified of the result. With this arrangement, since the user notices that the firmware has not been applied, compared to the case in which the user is not notified, substitution work (for example, investigating the application of another version of the firmware) with respect to the component to which the firmware has not been applied is promoted.

[2] Exemplary Modifications

The exemplary embodiment described above is merely an example of carrying out the present disclosure, and may also be modified as follows. Also, the exemplary embodiment and each exemplary modification may also be carried out in combination with each other as appropriate.

[2-1] Program Modules

In some cases, firmware includes multiple program modules which are individually applicable. A program module refers to the modularization of a subset of programs related to a common function, data, or the like from among the multiple programs included in the firmware. Hereinafter, a program module will also simple be called a "module".

Modules include, for example, a module that realizes a function of hardware initialization and diagnostics, a module that realizes a function of controlling various image processing services, a module that realizes a function of converting image data into a printable format, a module that holds font data, a module that realizes a function of controlling an automatic document feeder, a module that realizes a function of controlling a user interface (UI), and the like.

In the exemplary embodiment, the usability determination unit 104 makes a determination for each piece of firmware, but in the exemplary modification, the usability determination unit 104 makes a determination for each program module. To make this determination, the usability determination unit 104 uses a support table that indicates, for each module, supports relationships with each model.

Figure 9:
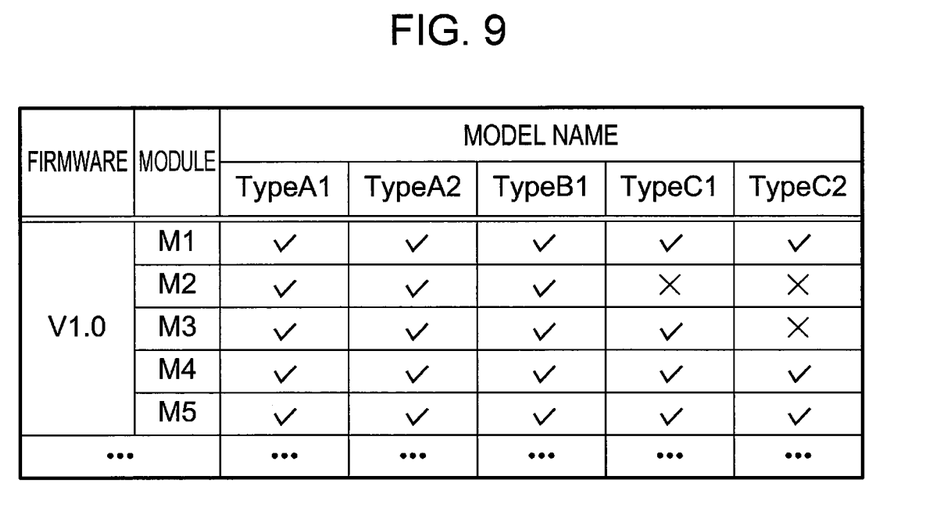
FIG. 9 is a diagram illustrating an example of a support table according to an exemplary modification.

FIG. 9 is a diagram illustrating an example of a support table according to the exemplary modification. In the example of FIG. 9, support relationships between the modules "M1", "M2", "M3", "M4", and "M5" of version "V1.0" of the firmware and each model of the image processing board 15 are illustrated.

For example, the modules "M1", "M4", and "M5" are supported on all models. Also, the module "M2" is supported on all models except "TypeC1" and "TypeC2", while the module "M3" is supported on all models except "TypeC2". In the case in which "V1.0" is specified by the version specification unit 102 and the component information indicating "TypeC1" is acquired, the usability determination unit 104 determines that the module "M2" is unusable, and that the other modules are usable.

The firmware application processing unit 105 according to the exemplary modification executes the application process and the prohibition process on each program module, similarly to the usability determination unit 104. In the case of the example described above, the firmware application processing unit 105 executes the prohibition process on the module "M2" determined to be unusable, and executes the application process on the other modules determined to be usable.

In the case in which the usability is determined for each piece of firmware, if the firmware is applied because all modules except the module "M2" are usable like in the example of FIG. 9, there is a possibility that an inexpedience caused by the module "M2" may occur. Such an inexpedience may affect not only functions or data related to the module "M2", but also the apparatus as a whole, such as if the apparatus no longer boots up or if communication becomes unavailable, for example.

In the exemplary modification, since the usability is determined for each module and only supported modules are applied as described above, even if the firmware contains a module that is not usable by the target component, an inexpedience caused by applying that module is avoided. On the other hand, since the usable modules are applied, compared to the case of determining the usability for each piece of firmware, the module environment is brought closer to the environment intended by the update work.

[2-2] User Approval

Some firmware may be confirmed to operate correctly after application, but may also be associated with certain changes when the firmware is applied. For example, there is firmware that, when applied, causes registered data (such as an address book) to be reset. The usability determination unit 104 may determine such firmware to be unusable, or determine such firmware to be usable.

In the case in which the usability determination unit 104 determines that the above firmware is usable, user approval may also be treated as a condition of application.

Figure 10:
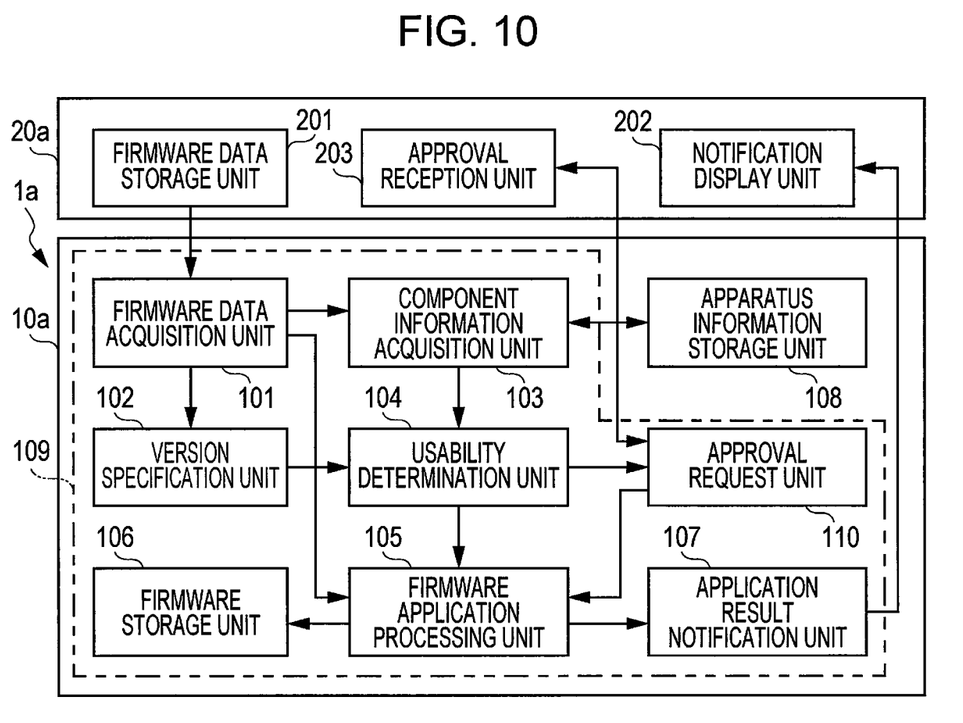
FIG. 10 is a diagram illustrating a functional configuration realized by an exemplary modification.

FIG. 10 is a diagram illustrating a functional configuration realized by the exemplary modification. FIG. 10 illustrates a firmware application support system 1a provided with an image processing apparatus 10a provided with an approval request unit 110 in addition to each unit illustrated in FIG. 4, and a worker terminal 20a provided with an approval reception unit 203 in addition to each unit illustrated in FIG. 4.

In the exemplary modification, the usability determination unit 104 also determines whether or not user approval is demanded for firmware determined to be usable with the parts configuration corresponding to the component information. The usability determination unit 104 makes the determination by using a support table indicating whether user approval is demanded in addition to the usability.

Figure 11:
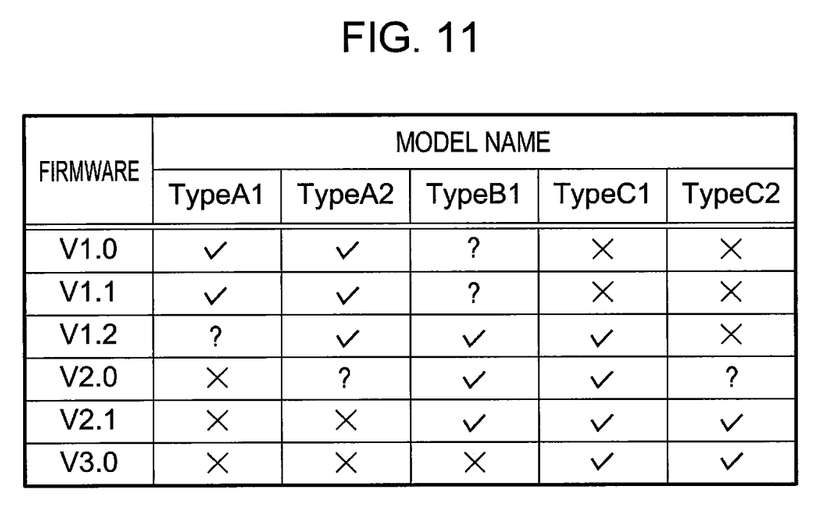
FIG. 11 is a diagram illustrating an example of a support table used in an exemplary modification.

FIG. 11 is a diagram illustrating an example of the support table used in the exemplary modification. In FIG. 11, from the support table illustrated in FIG. 6, a "?" mark is illustrated in correspondence with "V1.0" and "TypeB1", "V1.1" and "TypeB1", "V1.2" and "TypeA1", "V2.0" and "TypeA2", and "V2.0" and "TypeC2".

The "?" mark indicates that the firmware is usable if user approval is given. For example, in the case in which the acquired component information indicates "TypeA2", and version "V2.0" is specified, since a "?" mark is associated with this model name and version in the support table, the usability determination unit 104 determines that the firmware is usable if user approval is given. When making this determination, the usability determination unit 104 notifies the approval request unit 110 while also supplying the firmware data.

The approval request unit 110 requests approval from the user to apply the firmware that the usability determination unit 104 has determined to be usable if user approval is given. The approval request unit 110 is one example of a "first requester" according to the present disclosure. In the exemplary modification, the approval request unit 110 transmits approval request data indicating a request for the above approval to the transmission source of the firmware data, namely the worker terminal 20.

The worker terminal 20 supplies the transmitted approval request data to the approval reception unit 203. The approval reception unit 203 receives the supplied approval request data, and displays request content indicated by the approval request data.

Figure 12:
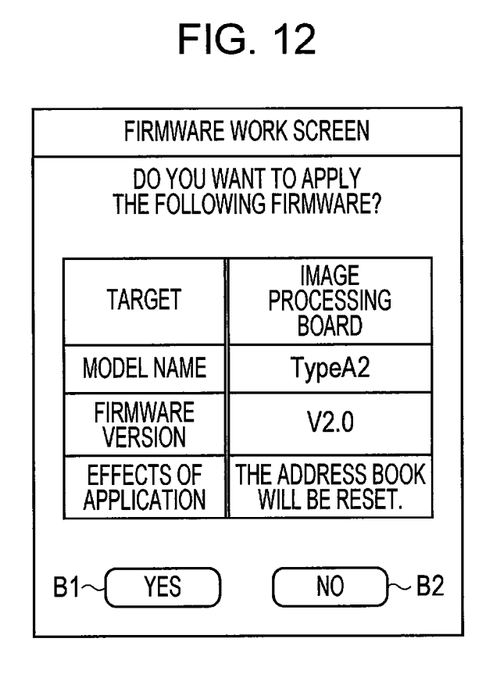
FIG. 12 is a diagram illustrating an example of displayed request content.

FIG. 12 illustrates an example of displayed request content. In the example of FIG. 12, the approval reception unit 203 displays, on a firmware work screen, the character string "Do you want to apply the following firmware?" and indicates that the target is the "image processing board", the model name is "TypeA2", and the firmware version is "V2.0".

Also, the approval reception unit 203 displays the character string "The address book will be reset." as an effect of application, as well as a Yes button B1 and a No button B2. The approval reception unit 203 receives an operation of pressing the Yes button B1 as an operation that accepts the application of the firmware, and receives an operation of pressing the No button B2 as an operation that denies the application of the firmware. The approval reception unit 203 transmits approval data indicating whether the user approves or disapproves to the image processing apparatus 10a.

The approval request unit 110 receives the transmitted approval data, and in the case in which the approval data indicates user acceptance (approval), the firmware data supplied from the usability determination unit 104 is supplied to the firmware application processing unit 105, whereas in the case in which the approval data indicates user denial (disapproval), the firmware data is not supplied. The firmware application processing unit 105 executes the application process similarly to the exemplary embodiment using the supplied firmware data.

In this way, in the case of obtaining user approval in response to a request by the approval request unit 110, the firmware application processing unit 105 applies the firmware that is the subject of the request. The firmware application processing unit 105 of the exemplary modification is one example of a "first applier" according to the present disclosure. In the exemplary modification, in the case in which firmware considered to demand user approval exists during application as above, the firmware is applied after first obtaining user approval.

[2-3] Components

In the exemplary embodiment, the image processing board 15 is used as the component to which to apply firmware, but the component is not limited thereto. Besides the above, insofar as firmware is applied to the component, any type of component may be used, such as a communication control board, a power control board, a control board for a driving mechanism (such as a motor), or the like. More specifically, for any component that includes one or more parts, if the parts configuration is modified, the version of usable firmware may change in some cases. Thus, by executing the application control process described in the exemplary embodiment, an inexpedience in the operation of a component of the electronic device due to the application of the firmware is avoided.

[2-4] Multiple Pieces of Firmware

In the case in which there are multiple pieces of firmware to be applied, the firmware application controller 109 determines the usability consecutively, for example, and executes the application process or the prohibition process depending on the determination result. At this time, in the case in which firmware demanding user approval is included as described in the above exemplary modification, user approval may be requested collectively later.

Figure 13:
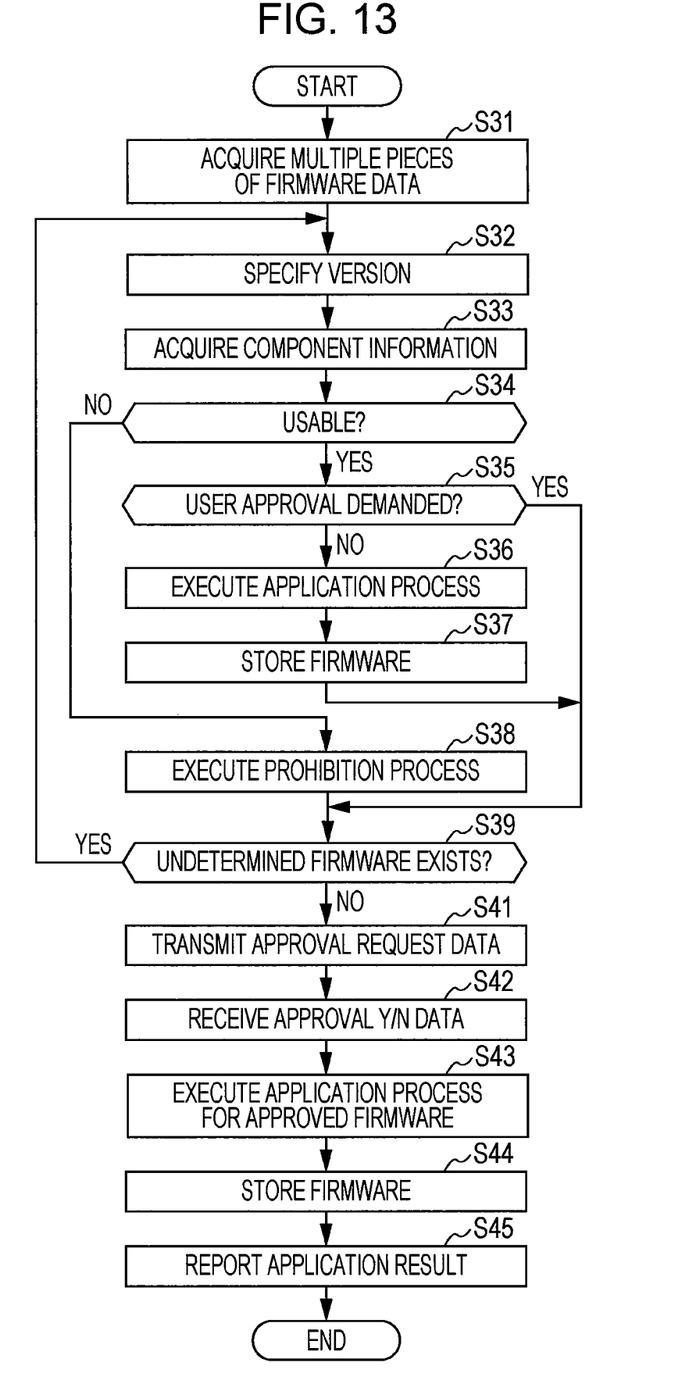
FIG. 13 is a diagram illustrating an example of an operating procedure in an application control process of an exemplary modification.

FIG. 13 illustrates an example of an operating procedure in the application control process of an exemplary modification. This operating procedure is started when triggered by the worker operating the worker terminal 20 to download and provide multiple pieces of firmware data to the image processing apparatus 10. First, the image processing apparatus 10 (firmware data acquisition unit 101) acquires the multiple pieces of firmware data transmitted from the worker terminal 20 (step S31).

Next, the image processing apparatus 10 (version specification unit 102) specifies the version of the firmware to be applied (step S32). Next, the image processing apparatus 10 (component information acquisition unit 103) acquires component information about a component that is a target of firmware application (step S33). Note that steps S32 and S33 may also be executed in reverse order, or in parallel.

Next, the image processing apparatus 10 (usability determination unit 104) determines whether or not the firmware of the version specified in step S12 is usable with the parts configuration corresponding to the component information acquired in step S13 (step S34). In the case of determining that the firmware is usable (YES) in step S34, the image processing apparatus 10 (usability determination unit 104) determines whether or not user approval is demanded (step S35).

In the case of determining that user approval is not demanded (NO) in step S35, the image processing apparatus 10 (firmware application processing unit 105) executes the application process of applying the firmware to the target component (step S36). When the application process is executed, the image processing apparatus 10 (firmware storage unit 106) stores the applied firmware (step S37). Also, in the case of determining that the version of firmware is unusable (NO) in step S34, the image processing apparatus 10 (firmware application processing unit 105) executes the prohibition process of prohibiting application of the firmware (step S38).

In the case of determining that user approval is demanded (YES) in step S35, or in the case of executing the operation in step S38, the image processing apparatus 10 determines whether or not an undetermined piece of firmware remains (step S39), and in the case of determining that an undetermined piece of firmware remains (YES), the image processing apparatus 10 returns to step S32 (the specification of the firmware version) and continues operations. In the case of determining that an undetermined piece of firmware does not remain (NO) in step S39, the image processing apparatus 10 (approval request unit 110) transmits approval request data requesting user approval with respect to the application of the firmware (or if plural, the multiple pieces of firmware) determined to demand user approval in step S35 (step S41).

Next, the image processing apparatus 10 (approval request unit 110) receives approval data transmitted from the worker terminal 20 that received the transmitted approval request data (step S42). Next, the image processing apparatus 10 (firmware application processing unit 105) executes the application process with respect to the firmware (or if plural, the multiple pieces of firmware) for which user approval is indicated by the received approval data (step S43).

The image processing apparatus 10 (firmware storage unit 106) stores all of the firmware applied in step S43 (step S44). Subsequently, the image processing apparatus 10 (application result notification unit 107) notifies the user of the firmware application result (step S45). As above, in the exemplary modification, for firmware that the usability determination unit 104 determines to be usable with the parts configuration corresponding to the component information acquired by the component information acquisition unit 103, but not to demand user approval, the firmware application processing unit 105 executes the application process when the determination is made.

Also, for firmware that the usability determination unit 104 determines to be unusable with the parts configuration corresponding to the component information acquired by the component information acquisition unit 103, the firmware application processing unit 105 executes the prohibition process when the determination is made. On the other hand, for firmware that the usability determination unit 104 determines to demand user approval, the approval request unit 110 requests the approval after the usability determination unit 104 has finished making determinations for all of the firmware to be applied.

Note that in the description of FIG. 13, in the case in which there are multiple pieces of firmware determined to demand user approval, the approval request unit 110 requests approval collectively, but the approval request unit 110 may also request approval consecutively. In either case, firmware that does not demand user approval (firmware that the usability determination unit 104 determines to be usable but not to demand user approval) is applied before the approval request process by the approval request unit 110 is executed.

How long the user approval operation takes is indeterminate. For example, in the case in which a worker is performing other work and is in a location where the worker terminal 20 is not visible, the approval operation will not be performed until the worker returns to the worker terminal 20. In the exemplary embodiment, in such cases, firmware application finishes more quickly (particularly for firmware that does not demand user approval) compared to a method of executing user approval and the application process consecutively.

[2-5] Notification of Usable Version

For firmware that the usability determination unit 104 determines to be unusable with the parts configuration corresponding to the acquired component information, the user may also be notified of a usable version.

In the exemplary embodiment, with regard to firmware on which the prohibition process has been executed, or in other words, for firmware that the usability determination unit 104 has determined to be unusable with the current parts configuration, the application result notification unit 107 notifies the user of a version of the firmware that is usable with the current parts configuration. The application result notification unit 107 is one example of a "second notifier" according to the present disclosure.

For example, the application result notification unit 107 stores a support table indicating the support relationships expressed in FIG. 6, and generates notification data indicating one or more versions supported by the model name indicated by the component information (which has been used in the usability determination) supplied from the firmware application processing unit 105. For example, in the case in which the model name is "TypeC2", the application result notification unit 107 generates notification data indicating "V2.0", "V2.1", and "V3.0" as usable versions, and transmits the generated notification data to the worker terminal 20.

Figure 14:
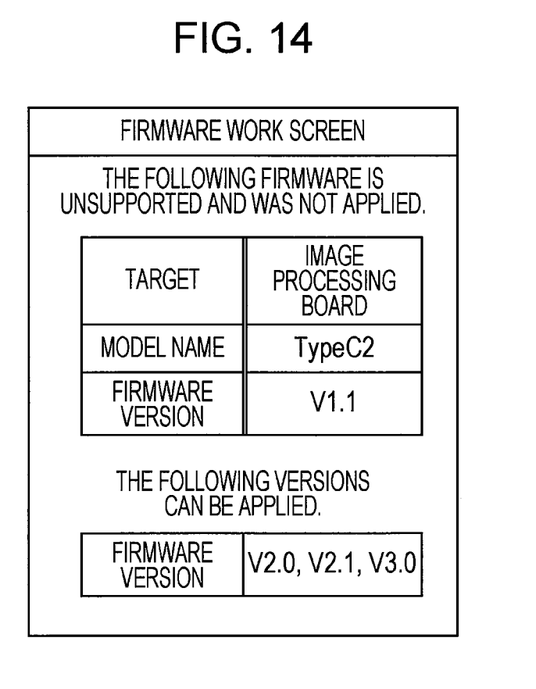
FIG. 14 is a diagram illustrating an example of displayed notification content in an exemplary modification.

FIG. 14 illustrates an example of displayed notification content in the exemplary modification. In the example of FIG. 14, in addition to the information illustrated in FIG. 7B (information related to the "V1.1" firmware that was not applied), the character string "The following versions can be applied." is displayed, and "V2.0", "V2.1", and "V3.0" are displayed as applicable firmware versions. By notifying the user of one or more usable versions in this way, in the exemplary embodiment, investigating the application of firmware to a component for which the firmware version that was to be applied is unusable becomes easier compared to the case of not notifying the user of the information illustrated in FIG. 14.

[2-6] Application of Usable Version

For firmware that the usability determination unit 104 determines to be unusable, a usable version of the firmware may also be applied automatically. In the exemplary modification, a worker performs operations of downloading firmware data that includes each version of the firmware, and transmitting the firmware data to the image processing apparatus 10.

The firmware data acquisition unit 101 acquires and directly stores the transmitted multiple pieces of firmware data, and thereby stores multiple versions of the firmware that are usable with the image processing board 15, for example. The firmware data acquisition unit 101 of the exemplary modification is one example of a "storage unit" according to the present disclosure. The firmware data acquisition unit 101 supplies the firmware data for the version to be applied from among the stored firmware data to the version specification unit 102 and the component information acquisition unit 103, similarly to the exemplary embodiment.

With this arrangement, a determination is made by the usability determination unit 104, similarly to the exemplary embodiment. In the case in which the usability determination unit 104 determines that the firmware is unusable with the target component, the firmware application processing unit 105 reads out from the firmware data acquisition unit 101 a version of the firmware that is usable with the parts configuration corresponding to the component information used in the determination, and applies the usable version. The firmware application processing unit 105 of the exemplary modification is one example of a "second applier" according to the present disclosure.

For example, the firmware application processing unit 105 stores a support table indicating the support relationships illustrated in FIG. 6, and specifies a version supported by the model name indicated by the component information used when the firmware was determined to be unusable. In the case in which multiple versions are specified, for example, the firmware application processing unit 105 specifies the version closest to the version of the firmware that was to be applied (typically, the version with the smallest difference between the numerical values indicating the versions).

For example, if "V1.1" was the version to be applied, and "V2.1" and "V3.0" are the supported versions, the firmware application processing unit 105 specifies "V2.1". The firmware application processing unit 105 reads out firmware data including the specified version of the firmware from the firmware data acquisition unit 101, and executes the application process using the read-out firmware data.

Note that the applied version of the firmware is not limited to being the one closest to the version of the firmware that was to be applied. For example, the worker may decide second-choice and third-choice versions, such that in the case in which the first-choice version (the version to be applied) is determined to be unusable, the firmware application processing unit 105 specifies the second-choice version if usable, and specifies the third-choice version if the second-choice version is unusable and the third-choice version is usable.

In the exemplary modification, as described above, a version of firmware is applied without waiting for a judgment by the user (worker). With this arrangement, in the case in which the method of deciding the firmware version to apply to a component for which the firmware version that was to be applied is unusable is determined like in the above example, the burden on the user during firmware application is reduced compared to the case in which the exemplary modification is not applied.

[2-7] User Approval

In the above exemplary modification, a usable version is applied automatically, but the usable version may also be applied after first obtaining user approval. In this exemplary modification, the firmware application support system 1a illustrated in FIG. 10 is used. In this exemplary modification, the firmware data acquisition unit 101 stores multiple versions of the firmware applicable to the image processing board 15, similarly to the exemplary modification described above.

Additionally, in the case in which the usability determination unit 104 determines that a version is unusable, the usability determination unit 104 notifies the approval request unit 110, and supplies firmware data including the target firmware as well as component information about the target component. On the basis of the supplied information, the approval request unit 110 requests approval from the user regarding the application of a usable version of the firmware to the component set as the target of firmware application. The approval request unit 110 of the exemplary modification is one example of a "second requester" according to the present disclosure.

Similarly to the firmware application processing unit 105 above, the approval request unit 110 specifies a version usable with the parts configuration corresponding to the component information used in the determination, generates approval request data that requests approval to apply the specified version of the firmware, and transmits the generated approval request data to the worker terminal 20.

Figure 15:
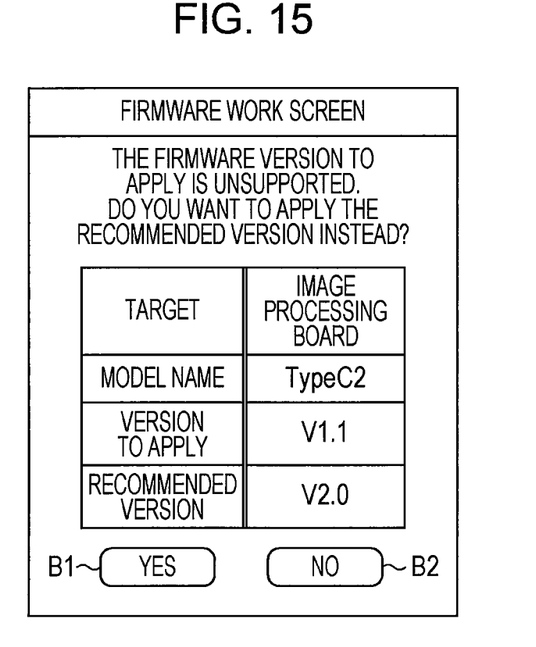
FIG. 15 is a diagram illustrating an example of displayed request content in an exemplary modification.

FIG. 15 illustrates an example of displayed request content in the exemplary modification. In the example of FIG. 15, approval reception unit 203 displays, on a firmware work screen, the character string "The firmware version to apply is unsupported. Do you want to apply the recommended version instead?", and indicates that the target is the "image processing board" and the model name is "TypeC2". Additionally, the approval reception unit 203 indicates that the version to be applied is "V1.1" and the recommended version is "V2.0", and displays the Yes button B1 and the No button B2.

In the case in which an operation of pressing the Yes button B1 is performed, or in other words, in the case of obtaining user approval in response to the request by the approval request unit 110, the firmware application processing unit 105 applies the firmware that is the subject of the request (in the example of FIG. 15, the V2.0 firmware). The firmware application processing unit 105 of the exemplary modification is one example of a "second applier" according to the present disclosure. In the exemplary modification, even when applying a usable version of firmware instead of an unusable version, user approval is obtained before applying the usable version.

[2-8] Method of Determining Usability

In the exemplary embodiment, the usability determination unit 104 determines usability by using a support table that indicates the support relationships illustrated in FIG. 6, but the method of determining usability is not limited thereto. For example, the firmware data may also include information indicating the support relationships illustrated in FIG. 6. For example, in a situation in which the firmware data includes V1.1 firmware, information indicating "TypeA1", "TypeA2", and "TypeB1" is included in the header.

In this case, the firmware data storage unit 201 of the worker terminal 20 stores firmware as information that associates firmware to be applied to a component with component information (for example, the model name) corresponding to one or more parts configurations of the component that are usable with that version of the firmware. The worker terminal 20 that provides such firmware data to the image processing apparatus 10 is one example of a "storage apparatus" according to the present disclosure.

In the case in which the model name indicated by the component information acquired by the component information acquisition unit 103 is included among the one or more model names included in the firmware provided as above, the usability determination unit 104 determines that the version of the firmware specified by the version specification unit 102 is usable. In this exemplary modification, usability is determined even if the image processing apparatus 10 does not store a support table.

[2-9] Method of Realizing Each Function

For each of the functions illustrated in FIGS. 4 and 10, two or more functions may also be combined, and a single function may also be divided into two or more functions. Additionally, operations executed by a certain function may also be executed by another function. Also, a configuration may also be realized by a single apparatus rather than two apparatus (an image processing apparatus and a worker terminal) like in the exemplary embodiment.

Also, in each of the above examples, each function is realized by the electronic device itself, but each function may also be realized by an apparatus different from the electronic device (for example, a situation in which the firmware application controller 109 is realized by an apparatus separate from the image processing apparatus). In short, insofar as each function illustrated in FIGS. 4 and 10 or an equivalent of each function is realized by the apparatus or system as a whole, each function may be realized by any kind of apparatus configuration.

For example, in the exemplary embodiment, the usability determination unit 104 and the firmware application processing unit 105 are realized by a single apparatus, but these units may also be realized by different apparatus (for example, a first apparatus and a second apparatus). For example, suppose that the first apparatus is provided with the version specification unit 102, the component information acquisition unit 103, and the usability determination unit 104, and determines the usability of firmware, while the second apparatus is provided with the firmware data acquisition unit 101, the firmware application processing unit 105, and the firmware storage unit 106, and applies firmware to the electronic device.

In this case, if the usability determination unit 104 determines that the specified version of the firmware is unusable with the parts configuration corresponding to the acquired component information, the usability determination unit 104 executes a process of transmitting instruction data indicating a prohibition on the application of the firmware to the second apparatus. The process of transmitting the instruction data in this case is one example of a "prohibition process" according to the present disclosure, and the usability determination unit 104 is one example of an "executor" according to the present disclosure. In this way, the content of the prohibition process changes depending on the relationship with the apparatus that applies the firmware.

[2-10] Component Information

In the exemplary embodiment, information indicating the model name of a component is used as the component information, but the component information is not limited thereto. For example, a model code of a component or the date when a component was released may also be used as component information. Also, a model list of the parts included in a component may also be used as component information. Additionally, the component information does not necessarily have to be information having a 1-to-1 correspondence with the parts configuration included in a component.

The reason for the above is that, even if the component of a certain model name actually has two variations of parts configurations, for example, if the version of firmware usable with the two parts configurations is shared in common, the usability will be determined correctly. In this case, any type of information may be used as the component information, as long as the information corresponds to the parts configuration included in a component, and a version of firmware usable with the parts configuration is specified thereby.

[2-11] Electronic Device

In the exemplary embodiment, an image processing apparatus is one example of an electronic device, but the electronic device is not limited thereto. For example, the electronic device may also be an image reading apparatus or an image forming apparatus. The electronic device may also be a personal computer, a smartphone, a tablet, a server, a router, a firewall apparatus, or the like. In short, any type of electronic device may be used insofar as the electronic device includes multiple components, and a program (firmware) for causing each component to operate is applied thereto.

[2-12] Categories of the Disclosure

The present disclosure may be taken to be an information processing apparatus that executes information processing for the entire information processing apparatus as a whole, or as a virtual information processing apparatus that realizes a subset of functions (for example, the firmware application controller 109) therein. In addition, the present disclosure may also be taken to be an information processing system called a firmware application support system provided with an image processing apparatus and a worker terminal.

In addition, the present disclosure may also be treated as an information processing method for realizing processing carried out by each apparatus, or as a program for causing a computer controlling each apparatus to function. The program may be provided in the form of a recording medium such as an optical disc with the program stored thereon, and may also be provided in a form causing a computer to download the program via a communication medium such as the Internet, and install and make the program available for use, for example.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a storage device; and
   a processor coupled to the storage device and configured to:
   specify that specifies a version of firmware to be applied to any of a plurality of components included in an electronic device, wherein the firmware includes a plurality of individually applicable program modules;
   acquire component information corresponding to a parts configuration included in a target component to which the firmware is to be applied;
   determine whether or not the specified version of the firmware is usable with the parts configuration corresponding to the acquired component information, wherein the processor further determines whether or not each program module is usable with the parts configuration;
   install the specified version of firmware after the processor having determined that the determined specified version of the firmware being unusable; and
   execute a prohibition process of prohibiting application of a program module of the specified version of the firmware in a case in which the processor determines that a component of the plurality of components is unusable by executing the prohibition process to the program module of the plurality of individually application program modules that corresponds to the component of the plurality of component and applies the other application program modules of the plurality of individually applicable program modules, wherein the specified version of the firmware to be installed is an older version than firmware already applied to the target component.

2. The information processing apparatus according to claim 1, wherein the processor is further configured to:

notify a user of the firmware on which the prohibition process is executed.

3. The information processing apparatus according to claim 2, wherein the processor is further configured to:
request user approval regarding the application of the firmware determined to be usable by the determiner; and
apply firmware to the target component, and in a case in which user approval is obtained in response to a request by the first requester, applies the firmware that is a subject of the request.

4. The information processing apparatus according to claim 3, wherein the processor is further configured to:
determine whether or not user approval is demanded with respect to the firmware determined to be usable with the parts configuration corresponding to the component information,
apply firmware when the processor determines that the firmware is usable with the parts configuration but user approval is not demanded, and
request user approval for a piece of firmware determined to demand user approval by the processor, after the processor has made a determination for all pieces of firmware to be applied.

5. The information processing apparatus according to claim 1, wherein the processor is further configured to:
notify a user of a version of firmware that is usable with the parts configuration determined by the processor to be unusable with the version of firmware to be applied.

6. The information processing apparatus according to claim 1,
wherein the storage device stores a plurality of versions of firmware applicable to the plurality of components; and
wherein the processor is further configured to apply firmware to the plurality of components, and reads out from the storage and applies a version of firmware that is usable with the parts configuration determined by the processor to be unusable with the version of firmware to be applied.

7. The information processing apparatus according to claim 6, wherein the processor is further configured to:
request user approval regarding the application of the usable version of the firmware, wherein
the processor applies the firmware that is a subject of the request in a case in which user approval is obtained in response to the request by the processor.

8. An electronic device comprising:
the information processing apparatus according to claim 1; and
an image forming processor that includes a plurality of components and forms an image on a medium.

9. An information processing system comprising:
the information processing apparatus according to claim 1; and
wherein the storage device stores information associating the firmware to be applied with component information corresponding to one or more parts configurations usable with a version of the firmware, and provides the information to the information processing apparatus.

* * * * *